United States Patent
Hellman et al.

(10) Patent No.: US 11,979,658 B2
(45) Date of Patent: May 7, 2024

(54) MULTIFUNCTIONAL POWER SOURCING EQUIPMENT

(71) Applicant: Axis AB, Lund (SE)

(72) Inventors: Johan Hellman, Lund (SE); Anna Wagnström, Lund (SE); Peter Jordow, Lund (SE)

(73) Assignee: AXIS AB, Lund (SE)

( * ) Notice: Subject to any disclaimer, the term of this patent is extended or adjusted under 35 U.S.C. 154(b) by 68 days.

(21) Appl. No.: 17/553,786

(22) Filed: Dec. 16, 2021

(65) Prior Publication Data

US 2023/0199302 A1    Jun. 22, 2023

(51) Int. Cl.
*H04L 12/10* (2006.01)
*H04L 1/00* (2006.01)
*H04N 7/18* (2006.01)
*H04N 23/50* (2023.01)
*H04N 23/65* (2023.01)
*H04N 23/661* (2023.01)

(52) U.S. Cl.
CPC ............ *H04N 23/651* (2023.01); *H04L 1/00* (2013.01); *H04L 12/10* (2013.01); *H04N 7/18* (2013.01); *H04N 23/50* (2023.01); *H04N 23/65* (2023.01); *H04N 23/661* (2023.01)

(58) Field of Classification Search
None
See application file for complete search history.

(56) References Cited

U.S. PATENT DOCUMENTS

| | | | | |
|---|---|---|---|---|
| 2010/0031032 A1* | 2/2010 | Ametsitsi | ................ | H04W 4/02 726/5 |
| 2015/0312048 A1* | 10/2015 | Bodo | ................ | H02J 13/00016 713/300 |
| 2017/0094170 A1* | 3/2017 | Shih | ........................ | H04N 23/65 |

* cited by examiner

*Primary Examiner* — Paul Yen
(74) *Attorney, Agent, or Firm* — XSENSUS LLP

(57) ABSTRACT

A surveillance camera system includes a power sourcing equipment corresponding to a midspan having one or more of integrated input/output (I/O) and audio port functionality, the power sourcing equipment including processing circuitry, one or more data ports, one or more of an I/O port and an audio port, and a Power over Ethernet (PoE) port. Additionally, the surveillance camera system includes a camera connected to the power sourcing equipment by the PoE port, and a computer connected to the power sourcing equipment by one of the data ports, wherein the computer is configured to receive data from and transmit data to the camera via the power sourcing equipment.

7 Claims, 7 Drawing Sheets

MULTIFUNCTIONAL POWER SOURCING EQUIPMENT

FIELD OF THE DISCLOSURE

The present disclosure relates to an apparatus and associated methodology for power sourcing equipment. More particularly, the present disclosure relates to devices, systems, and methods that provide Power over Ethernet to cameras.

BACKGROUND

Monitoring systems for monitoring of premises, areas of particular interest and/or processes connected via a computer network to monitoring or surveillance servers are increasingly popular. Network camera systems can be based on the Internet protocol (IP) and use Ethernet based networking technology. In some applications, network camera systems are replacing analog closed-circuit television (CCTV) due to various factors, such as accessibility, ease-of-use, cabling scalability, and lower cost of deployment and operation.

Typically, existing surveillance cameras such as outdoor surveillance cameras have removed audio and input/output (I/O) inputs into the camera for a variety of reasons. For example, removing audio and I/O inputs can save space and make the camera more compact. Additionally, the Ingress Protection (IP) Code is an IEC standard (60529) which classifies and rates the degree of protection provided by mechanical casings and electrical enclosures against intrusion, dust, accidental contact, and water, and removing the audio and I/O inputs from the camera can assist in meeting this standard. Instead, this functionality can be added to a device positioned between a switch and the camera. This device can have both audio and I/O ports which can provide sound and additional sensors, for example. However, this still requires an extra device positioned between the camera and the switch for customers who want audio and I/O ports.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a surveillance camera system includes a power sourcing equipment corresponding to a midspan having integrated input/output (I/O) and/or audio port functionality, the power sourcing equipment including processing circuitry, one or more data ports, one or more of an I/O port and an audio port, and a Power over Ethernet (PoE) port. Additionally, the surveillance camera system includes a camera connected to the power sourcing equipment by the PoE port, and a computer connected to the power sourcing equipment by one of the data ports, wherein the computer is configured to receive data from and transmit data to the camera via the power sourcing equipment.

According to aspects of the disclosed subject matter, a midspan includes integrated input/output (I/O) and/or audio port functionality, processing circuitry, one or more data ports, wherein a computer is connected to the midspan by one of the data ports and is configured to receive data from and transmit data to a camera via the midspan, one or more of an I/O port and an audio port, and a Power over Ethernet (PoE) port, wherein the camera is connected to the midspan by the PoE port.

According to aspects of the disclosed subject matter, an electronic device includes integrated input/output (I/O) and/or audio port functionality, processing circuitry, one or more data ports, wherein a computer is connected to the electronic device by one of the data ports and is configured to receive data from and transmit data to a camera via the electronic device, one or more of an I/O port and audio port, and a Power over Ethernet (PoE) port, wherein the camera is connected to the electronic device by the PoE port, wherein the electronic device is connected to an AC power source and a power supply unit transforms AC power (e.g., 230V AC) received from the AC power source to DC power (e.g., 54V DC). The DC power is then split into a first predetermined amount of power and a second predetermined amount of power, wherein the internal functions (e.g., including I/O and audio port functions) are powered only by the first predetermined amount of power (e.g., an internal supply voltage, e.g., 3.3 V) generated from the DC signal, and the PoE is powered only by the second predetermined amount of power and is available only to power the camera. In one aspect, the second predetermined amount can be defined by a PoE standard, for example.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
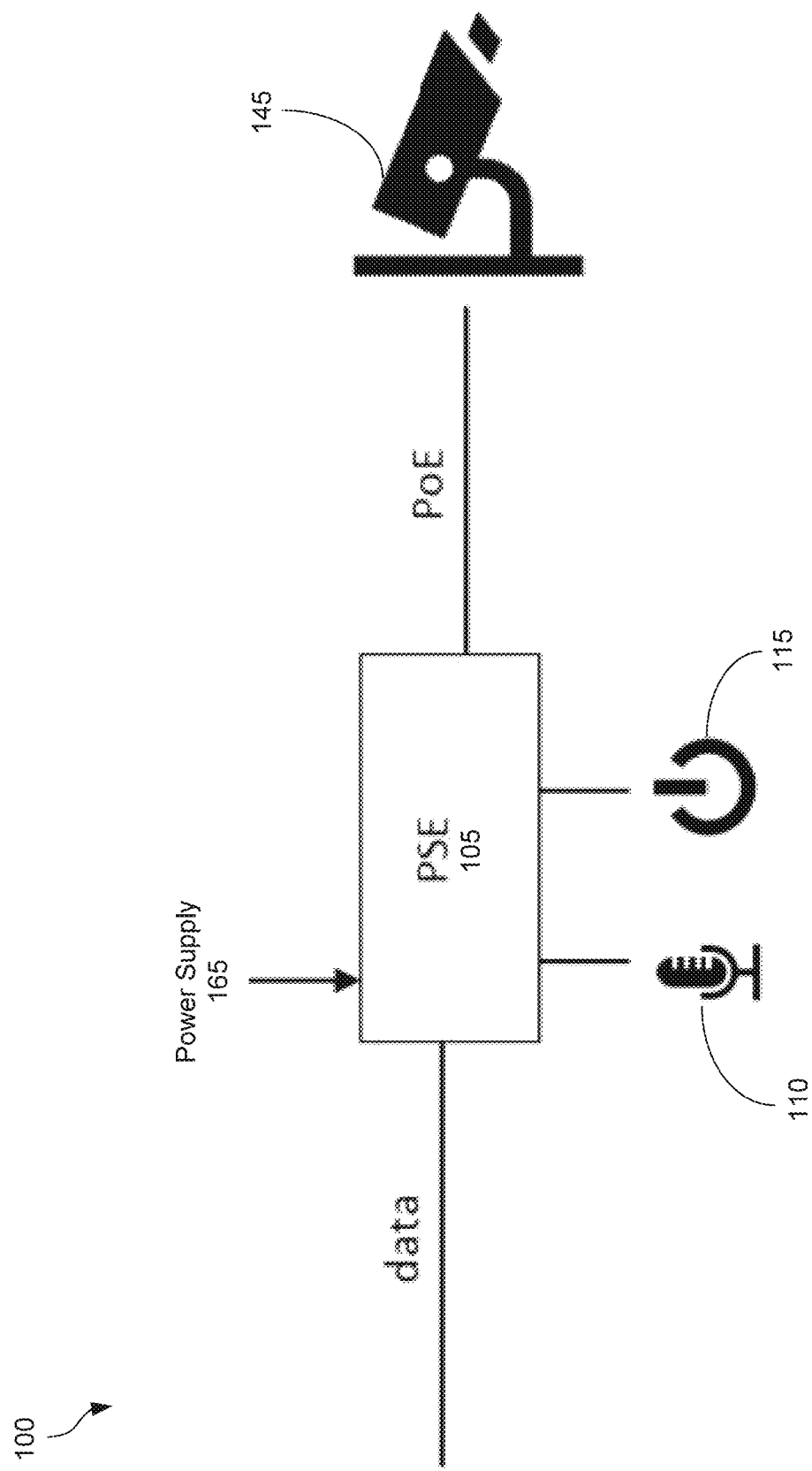
FIG. 1A illustrates an exemplary overview of a surveillance camera system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1A illustrates an exemplary overview of a surveillance camera system 100 according to one or more aspects of the disclosed subject matter. In one embodiment, the surveillance camera system 100 (herein referred to as the system 100) can include a multifunctional power sourcing equipment (PSE) 105 connected to a camera 145. The multifunctional PSE 105 can include one or more audio ports 110, one or more I/O ports 115, and a power supply 165.

Generally speaking, most surveillance installations only really need connectivity in a few cameras. As a result, many customers choose cameras without built-in connectivity which saves on cost and results in smaller and more compact cameras. In addition, a reduction of built-in connectivity in cameras, in particular outdoor cameras, can assist in meeting Ingress Protection (IP) Code standards. Then connectivity can be added only where it is needed. To get this additional connectivity, customers can use an intermediate device located between and connected to a traditional midspan device and the camera. A traditional midspan device is used for powering Power over Ethernet (PoE) devices (i.e., the camera in this case) via an Ethernet cable. Power over Ethernet (PoE) offers an easy, fast, and cost-effective solution for powering network products. With a single network cable, a midspan device can inject power to the network device with built-in PoE support and enables data communication between the camera and a switch.

The intermediate device is configured to add two-way audio and I/O connectivity to the network camera. This additional connectivity can provide better support for decision-making, enable users to listen in to transactions or incidences or communicate warnings to intruders, connect sensors that can trigger an alarm if a door is opened or a pane of glass is broken, connect outputs to control devices or relays to open or close doors, turn lights off and on, and the like, for example. However, while gaining benefits of removing ports (e.g., audio ports, I/O ports, etc.) from the camera (e.g., to fulfil an IP class as described above), there is introduced a need for enabling connection and powering to the intermediate device. In order to avoid extra cabling, the intermediate device is preferably connected to the Ethernet connection between the traditional midspan device and the camera. The intermediate device is arranged to utilize the Ethernet connection for data transfer to a computer, via the midspan device, and as power supply for internal functions of the intermediate device. Thus, the midspan device provides power to both the camera and the intermediate device.

As further described herein, the multifunctional PSE 105 improves this setup by providing customers with PoE injection and the additional port functionality in a single device.

More specifically, the multifunctional PSE 105 is a midspan device that is a PoE provider that can be connected to the camera 145 in the same way as a traditional midspan device. More specifically, the multifunctional PSE 105 can also include audio ports (e.g., audio ports 110) and I/O ports (e.g., I/O ports 115). In other words, the multifunctional PSE 105 includes not only PoE ports, but also audio ports and I/O ports. Additionally, the audio ports 110 and the I/O ports 115 are power supplied by the power supply 165 and do not use PoE power that is provided to the camera 145. In one aspect, the power supply 165 can be a 230 volts (V) power supply. Further, the power consumption of the connected camera can be calculated by the multifunctional PSE 105. In one aspect, the power consumption can be displayed to a user as status information or for analysis of efficiency.

It should be appreciated that reference to PoE herein can refer to one or more of several PoE standards. For example, PoE standards can include the original IEEE 802.3af-2003 PoE standard, the updated IEEE 802.3 at-2009 PoE standard also known as PoE+ or PoE plus, and the IEEE 802.3bt-2018 standard also known as PoE++ or 4PPoE. In other words, unless stated otherwise, reference to PoE herein can refer to the original PoE standard, PoE+, PoE++, and/or any future PoE standard. Additionally, the multifunctional PSE 105 is not limited to any particular PoE standard.

Figure 1B:
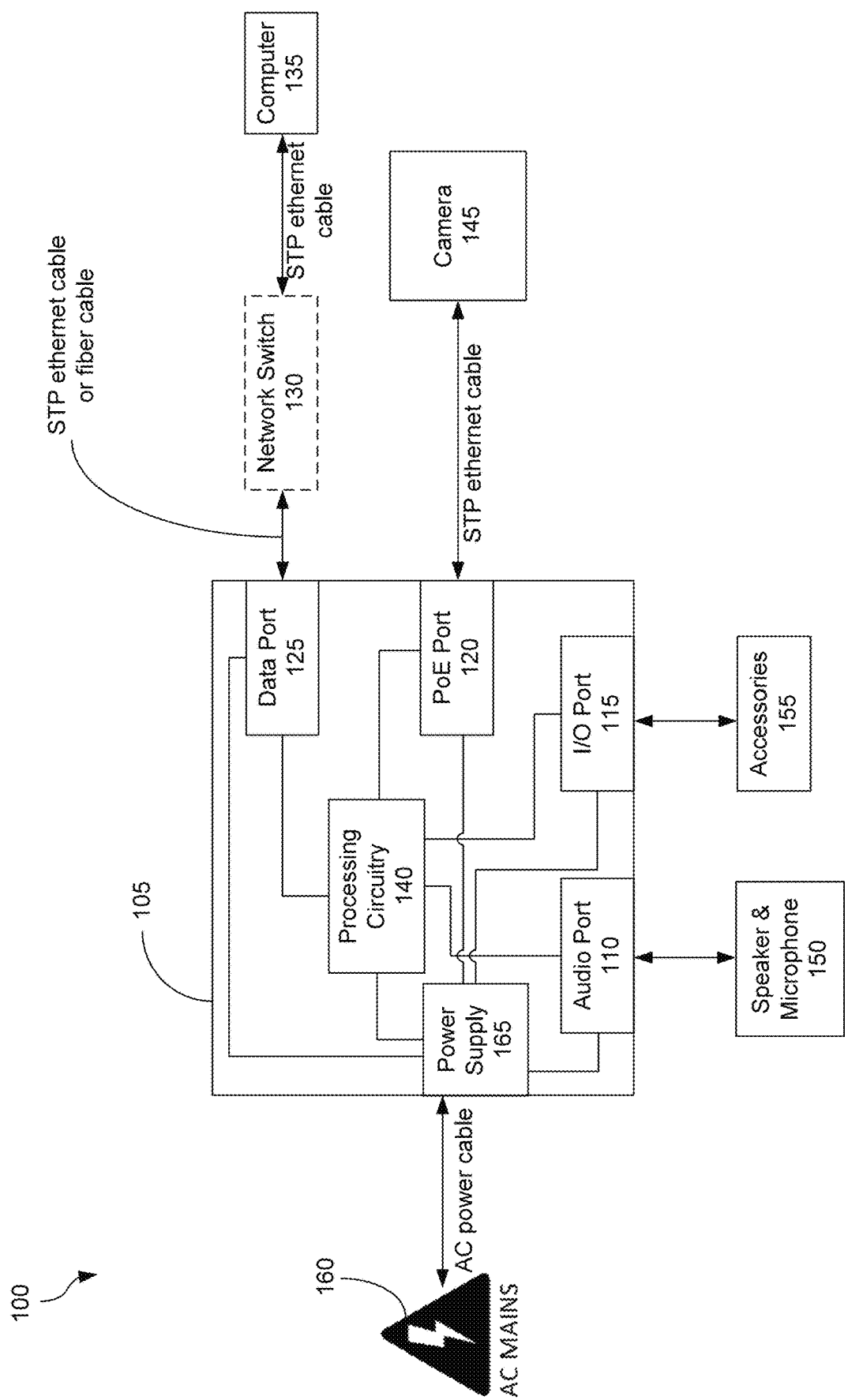
FIG. 1B illustrates an exemplary overview of the surveillance camera system according to one or more aspects of the disclosed subject matter.

FIG. 1B illustrates an exemplary overview of the system 100 according to one or more aspects of the disclosed subject matter. In one embodiment, the system 100 can include the multifunctional PSE 105. The multifunctional PSE 105 can be connected to an AC power source 160 such that an AC power cable connects the AC power source 160 and the power supply 165, a computer 135 such that an STP ethernet cable connects the computer 135 and a data port, the camera 145 such that an STP Ethernet cable connects the camera 145 and a PoE port, one or more speakers and/or a digital or analogue audio source (e.g., a microphone) 150, and one or more accessories 155. In one aspect, the multifunctional PSE 105 can optionally be connected to a network switch 130 via an STP ethernet cable or a fiber cable, and the computer 135 can be connected to the multifunctional PSE 105 via the network switch 130. The computer 135 can be configured to receive data from and transmit data to the camera 145 via the multifunctional PSE 105.

Additionally, the multifunctional PSE 105 can include an audio port 110, an I/O port 115, a PoE port 120, data port 125, and processing circuitry 140.

The audio port 110 can represent one or more audio ports in the multifunctional PSE 105. For example, one or more speakers and/or one or more digital or analog audio sources (e.g., a microphone) can be connected to the multifunctional PSE 105 via the audio port 110.

The I/O port 115 can represent one or more I/O ports in the multifunctional PSE 105. For example, one or more accessories (e.g., accessories 155) can be connected to the multifunctional PSE 105 via the I/O port. In one aspect, the accessories can be low voltage and/or low frequency accessories. For example, the accessories can include connecting sensors that can trigger an alarm if a door is opened or a pane of glass is broken, connecting outputs to control devices or relays to open or close doors, connecting a controller to turn lights off and on, and the like.

The PoE port 120 can represent one or more PoE ports in the multifunctional PSE 105. For example, the camera 145 can be connected to the multifunctional PSE 105 via the PoE port 120. In one aspect, the camera 145 can be connected to the PoE port 120 by a shielded twisted pair (STP) ethernet cable.

The data port 125 can represent one or more data ports in the multifunctional PSE 105. For example, the data port 125 can include a data in port for copper and a small form-factor pluggable (SFP) port as a data in port for optical fiber.

The processing circuitry 140 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processing circuitry 140 may perform signal coding, data processing, power control, input/output processing, and/or any other functionality that enables the multifunctional PSE 105 to operate as further described herein.

In one aspect, the DC power from the AC power source 160 can be split by the power supply 165. In one aspect, 230V AC is received from the AC power source 160 and the power supply 165 can transform the 230V AC to 54V DC. Then, the power supply 165 can split the 54V DC signal such that 1) a portion of the DC power generates an internal supply voltage (e.g., 3.3V) that is used for the internal functions of the multifunctional PSE 105 (e.g., the audio port 110 and/or the I/O port 115), and 2) another portion of the 54V DC signal is used to generate a PoE signal for the camera via the PoE port 120 so that power is available for PoE. For example, this another portion can be used to power the camera 145 using PoE. In other words, the DC power can be split into a first predetermined amount of power and a second predetermined amount of power. The first predetermined amount of power can be used to power the audio port 110 and/or the I/O port 115. The second predetermined amount of power can be available for PoE, and a PoE negotiation can determine the amount of power used (e.g., by the camera 145) up to the predetermined second amount. In one aspect, the AC power is split so that the audio port 110 and the I/O port 115 (and any other internal functions) are only powered by the first predetermined amount of power, and the camera 145 is only powered by the second predetermined amount of power, wherein the second predetermined amount of power is available for PoE. Because the DC power is split, the multifunctional PSE 105 can calculate (e.g., via the processing circuitry 140) a power consumption of the camera 145 based on the PoE connection. The multifunctional PSE 105 can then provide the calculated power consumption of the camera 145 to the computer 135, for example. As a result, the power consumption can be displayed to a user as status information or for analysis of efficiency, for example.

Figure 2:
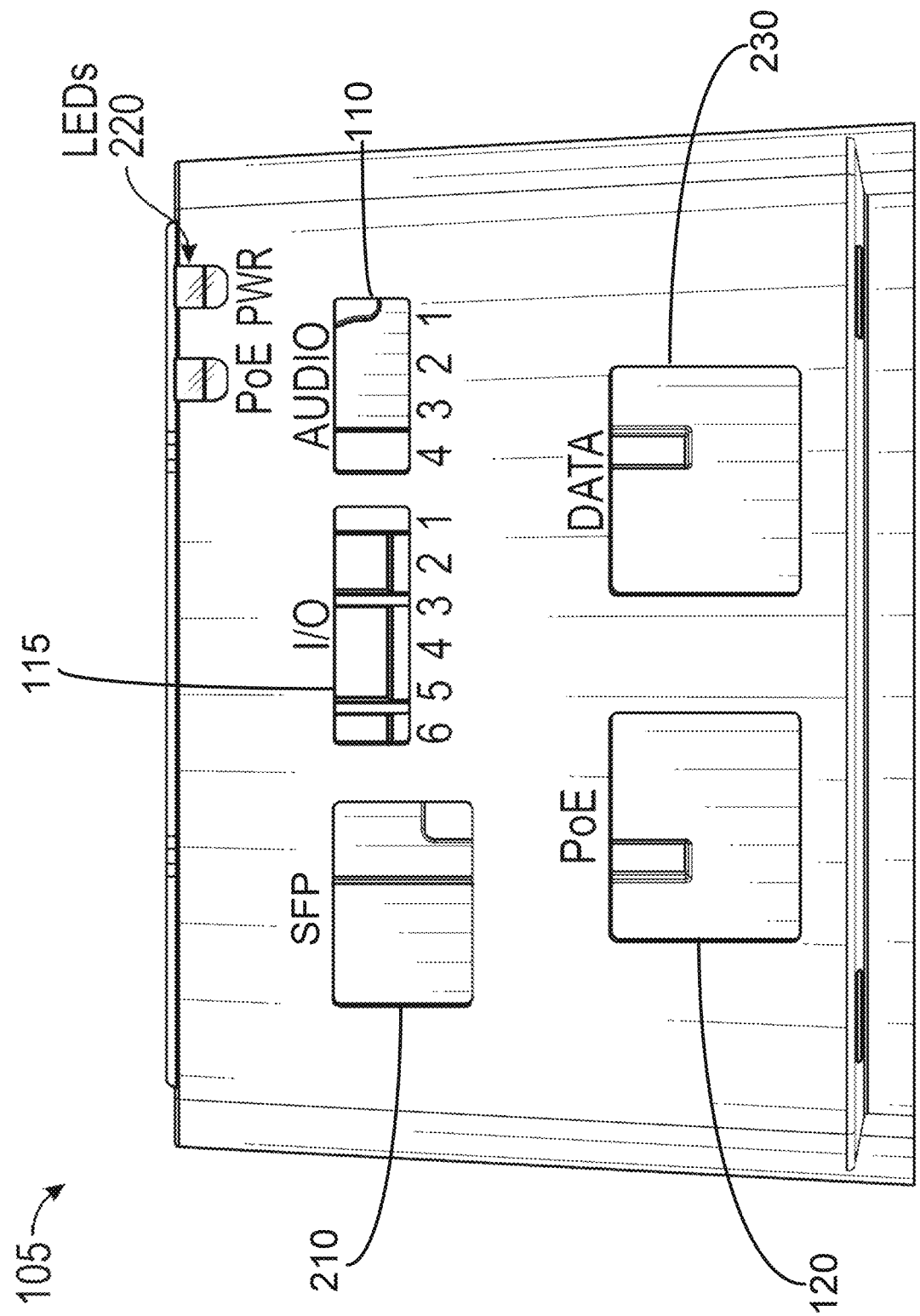
FIG. 2 illustrates a front view of a multifunctional power sourcing equipment according to one or more aspects of the disclosed subject matter.

FIG. 2 illustrates a front view of the multifunctional PSE 105 according to one or more aspects of the disclosed subject matter. The front view of the multifunctional PSE 105 illustrates a more detailed view of the various ports that can be included in the multifunctional PSE 105. Additionally, the multifunctional PSE 105 can include one or more LEDs 220. In one aspect, the multifunctional PSE 105 can include a first LED indicating a power status of the multifunctional PSE 105 and a second LED indicating a PoE status (i.e., whether PoE is in use or not).

The audio port 110 can use various pin arrangements. In one aspect, the audio port 110 can include four pins in the following arrangement: 1: GND; 2: +12.7 V, max 50 mA; 3: Audio In; 4: Audio Out. The I/O port 115 can include various pin arrangements. In one aspect, the I/O port 115 can include 6 pins in the following arrangement: 1: GND; 2: +12.7 V, max 50 mA; 3: Input/Output 1; 4: Input/Output 2; 5: Input/Output 3; 6: Input 4. In one aspect, the PoE port 120 is a port for Power over Ethernet and data out (copper) for data and power up to 90 W (e.g., set by PoE standard IEEE 802.3bt), 54 V. In one aspect, the data port 230 can be one of the one or more data ports 125. The data port 230 can be a data in port for copper and configured for data only and no power. In one aspect, the SFP port 210 can be one of the one or more data ports 125. The SFP port 210 can be a data in port for optical fiber and configured for data only and no power.

Figure 3:
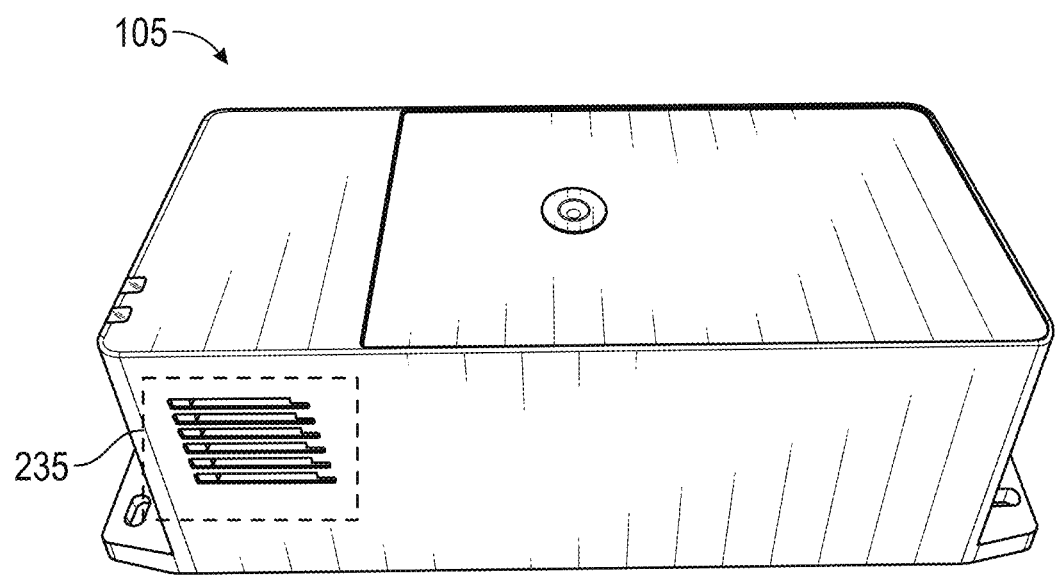
FIG. 3 illustrates a perspective view of the multifunctional power sourcing equipment according to one or more aspects of the disclosed subject matter.

FIG. 3 illustrates a perspective view of the multifunctional PSE 105 according to one or more aspects of the disclosed subject matter. The multifunctional PSE 105 can include one or more ventilation holes 235. In one aspect, the multifunctional PSE 105 can include two ventilation holes so that one ventilation hole 235 is disposed on each side of the multifunctional PSE 105. Additionally, the multifunctional PSE 105 can include a fan disposed within the chassis of the multifunctional PSE 105 configured to provide active cooling (e.g., fan cooling) for the multifunctional PSE 105. In one aspect, the chassis of the multifunctional PSE can be made of plastic. Alternatively, the chassis can be made of metal for improved cooling. In one aspect, the multifunctional PSE 105 is configured to be disposed within a mounting bracket used to mount the camera 145. This provides advantages including ease of installation.

Figure 4:
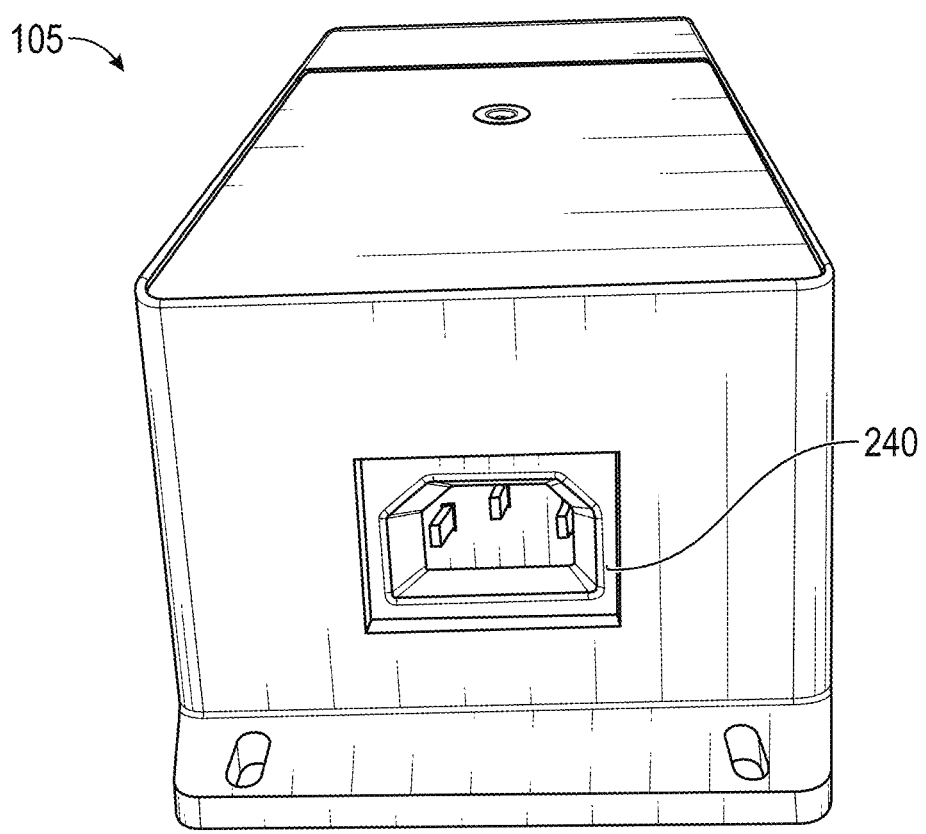
FIG. 4 illustrates a rear view of the multifunctional power sourcing equipment according to one or more aspects of the disclosed subject matter.

FIG. 4 illustrates a rear view of the multifunctional PSE 105 according to one or more aspects of the disclosed subject matter. The multifunctional PSE 105 can include a connector 240 for the AC power source 160.

Figure 5:
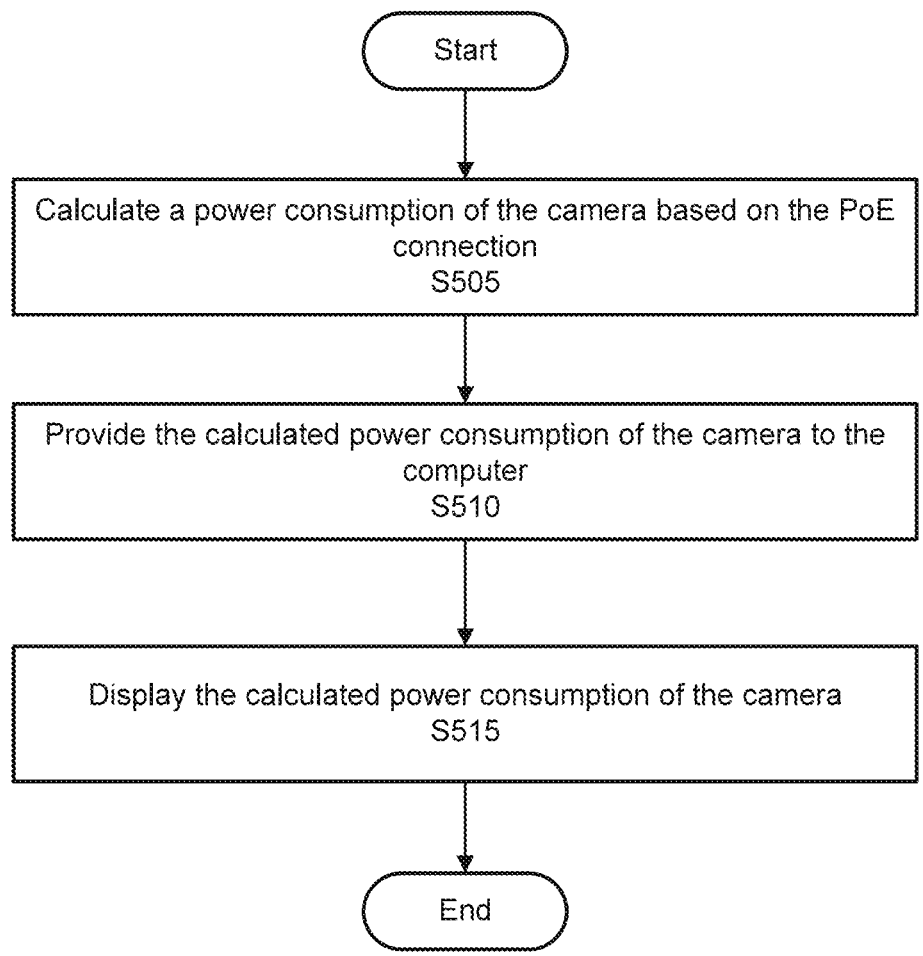
FIG. 5 is an algorithmic flow chart of a method for determining a power consumption of a camera according to one or more aspects of the disclosed subject matter.

FIG. 5 is an algorithmic flow chart of a method for determining a power consumption of the camera 145 according to one or more aspects of the disclosed subject matter.

In S505, the processing circuitry 140 can be configured to calculate a power consumption of a camera (e.g., the camera 145) based on the PoE connection. In other words, the processing circuitry 140 reads voltage and current in the cable to the camera, which is used to calculate power. Because the power is split between the camera and other functions, the amount of power sent to the camera (and used only by the camera) can be determined precisely. Accordingly, no other device needs to be connected between the multifunctional PSE 105 and the camera 145 to add audio or I/O since this functionality is added to the multifunctional PSE 105 and powered separately from the camera 145.

In S510, the processing circuitry 140 can provide the calculated power consumption of the camera 145 to a computer in the system 100 (e.g., the computer 135).

In S515, the computer 135 can be configured to display the calculated power consumption (e.g., as status information or for analysis of efficiency).

After, displaying the calculated power consumption of the camera 145, the process can end.

In the above description of FIG. 5, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 6:
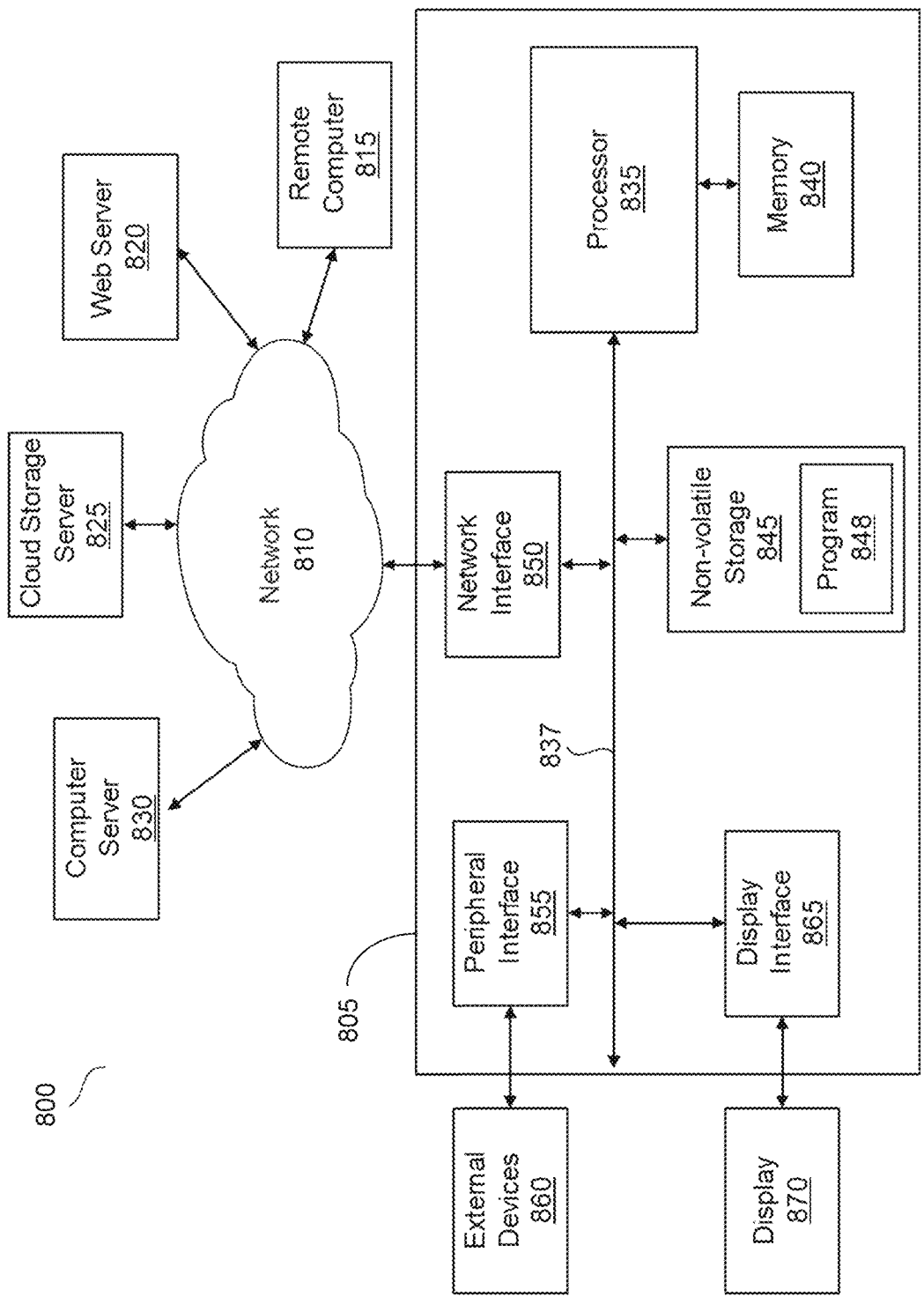
FIG. 6 is a hardware block diagram of a computer according to one or more exemplary aspects of the disclosed subject matter.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure. For example, in one aspect, the computer 805 can represent the computer 135.

Referring to FIG. 6, a networked system 800 may include, but is not limited to, computer 805, network 810, remote computer 815, web server 820, cloud storage server 825 and computer server 830.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. In one aspect, external devices 860 may also include the multifunctional PSE 105. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A midspan, comprising:
one or more of integrated input/output (I/O) and audio port functionality;
processing circuitry;
one or more data ports, wherein a computer is connected to the midspan by one of the data ports and is configured to receive data from and transmit data to a camera via the midspan;
one or more of an I/O port and an audio port; and
a Power over Ethernet (PoE) port, wherein the camera is connected to the midspan by the PoE port,
wherein the midspan is connected to a power source via a power supply,
wherein power from the power supply is split at the power supply into a first predetermined amount of power and a second predetermined amount of power, wherein the first predetermined amount of power is an internal supply voltage required for the internal functions of the midspan and the one or more of the I/O and audio port are powered only by the first predetermined amount of power,
wherein the camera is powered only by the second predetermined amount of power, wherein the second predetermined amount of power is available for PoE, and
wherein a PoE negotiation determines an amount of power used from only the second predetermined amount of power up to the predetermined second amount based on a power consumption of the camera when the camera is connected to the midspan.

2. The midspan of claim 1, wherein the I/O port includes a plurality of I/O pins.

3. The midspan of claim 1, wherein the power source is an AC power.

4. The midspan of claim 1, wherein the processing circuitry is configured to
calculate a power consumption of the camera based on the PoE connection, and
provide the calculated power consumption of the camera to one or more of the camera and the computer.

5. The midspan of claim 1, wherein the midspan is connected to a network switch by one of the data ports, wherein the computer is connected to the midspan via the network switch.

6. The midspan of claim 1, wherein one or more low voltage accessories are connected to the midspan by the I/O port.

7. An electronic device, comprising:
one or more of integrated input/output (I/O) and audio port functionality;
processing circuitry;
one or more data ports, wherein a computer is connected to the electronic device by one of the data ports and is configured to receive data from and transmit data to a camera via the electronic device;
one or more of an I/O port and an audio port; and
a Power over Ethernet (PoE) port, wherein the camera is connected to the electronic device by the PoE port,
wherein the electronic device is connected to an power source via a power supply and power from the power supply is split at the power supply into a first predetermined amount of power and a second predetermined amount of power, wherein the first predetermined amount of power is an internal supply voltage required for the internal functions of the electronic device, and the one or more of the I/O and audio port are powered only by the first predetermined amount of power and the PoE is powered only by the second predetermined amount of power and is available only to power the camera,
wherein a PoE negotiation determines an amount of power used up to the predetermined second amount based on a power consumption of the camera when the camera is connected to the electronic device.

* * * * *